(12) United States Patent
Xu et al.

(10) Patent No.: US 9,881,087 B2
(45) Date of Patent: Jan. 30, 2018

(54) SEARCHING MULTIPLE SELLERS BY MULTIPLE MATCHING ITEMS

(75) Inventors: Bei Xu, Shanghai (CN); Chaoou Huang, Shanghai (CN)

(73) Assignee: eBay Inc., San Jose, CA (US)

( * ) Notice: Subject to any disclaimer, the term of this patent is extended or adjusted under 35 U.S.C. 154(b) by 831 days.

(21) Appl. No.: 13/319,061

(22) PCT Filed: Dec. 17, 2009

(86) PCT No.: PCT/CN2009/001481
§ 371 (c)(1),
(2), (4) Date: Dec. 15, 2011

(87) PCT Pub. No.: WO2011/072424
PCT Pub. Date: Jun. 23, 2011

(65) Prior Publication Data
US 2012/0117047 A1    May 10, 2012

(51) Int. Cl.
| G06Q 30/00 | (2012.01) |
| G06F 17/30 | (2006.01) |
| G06Q 10/08 | (2012.01) |
| G06Q 30/06 | (2012.01) |

(52) U.S. Cl.
CPC ..... *G06F 17/30864* (2013.01); *G06Q 10/087* (2013.01); *G06Q 30/06* (2013.01)

(58) Field of Classification Search
CPC .......................................... G06Q 30/06–30/08
USPC .................................. 705/26–27, 26.1–27.2
See application file for complete search history.

(56) References Cited

U.S. PATENT DOCUMENTS

| 2002/0143550 | A1* | 10/2002 | Nakatsuyama | ......... G10L 15/26 704/270.1 |
| 2008/0021906 | A1* | 1/2008 | Lunenfeld | ....................... 707/10 |
| 2008/0183819 | A1 | 7/2008 | Gould et al. | |
| 2008/0201228 | A1 | 8/2008 | Gillet et al. | |

FOREIGN PATENT DOCUMENTS

| CN | 101179472 A | 5/2008 |
| CN | 101203856 A | 6/2008 |

OTHER PUBLICATIONS

"CDW Computer Centers Takes Online Shopping to the Next Level" Business Wire (May 18, 1998). (Year: 1998).*

(Continued)

*Primary Examiner* — Ethan D Civan
(74) *Attorney, Agent, or Firm* — Shook, Hardy & Bacon L.L.P.

(57) ABSTRACT

In various exemplary embodiments, a system and associated method for to perform a search for a plurality of items in an electronic environment. In one embodiment, the system includes a keyword prompt engine to receive a plurality of keywords from an end-user. Each of the plurality of keywords is related to the plurality of items for which the end-user is searching. A price range engine prompts the end-user to input a price range for each of the plurality of items. A search engine uses one or more processors to locate the plurality of items in an inventory within the electronic environment based on the plurality of keywords and the price range. The search engine further matches concurrently one or more sellers having the plurality of items available for sale.

6 Claims, 6 Drawing Sheets

(56) References Cited

OTHER PUBLICATIONS

"International Application Serial No. PCT/CN2009/001481, International Search Report dated Sep. 30, 2010", 4 pgs.
"International Application Serial No. PCT/CN2009/001481, Written Opinion dated Sep. 30, 2010", 4 pgs.

* cited by examiner

Search results matching your search options:

From: 816pcktingenterprises ( 165 ☆ ) me

1. Search keywords "ipod" in "All Categories" and priced from $ 100.0 to $ 1000.0

WHITE iRhythms IPOD SPEAKER SYSTEM, NEW Retails @ $149    0 Bids    $128.49    4d 6h 8m 2s
   View item in a new window 2. Search keywords "wii" in "All Categories" and priced from $ 100.0 to $ 1000.0

NINTENDO WII VIDEO GAME SYSTEM 4 PLAYER WII FIT BUNDLE    0 Bids    $699.99    3d 10h 25m 33s
   View item in a new window NINTENDO WII SYSTEM + WII FIT, BALANCE BOARD MAT BUNDLE   0 Bids    $461.45    3d 10h 14m 58s
   View item in a new window NINTENDO WII FUN BUNDLE - WITH 14 GREAT GAMES AND EXTRA   0 Bids    $435.99    3d 10h 14m 8s
   View item in a new window 3. Search keywords "xbox 360" in "All Categories" and priced from $ 100.0 to $ 1000.0

XBOX 360 PRO 60GB CONSOLE WITH 2 BONUS GAMES AND COOLIN   0 Bids    $398.99    3d 10h 30m 10s
   View item in a new window From: lisa1961-2003 ( 46 ☆ ) me 1. Search keywords "ipod" in "All Categories" and priced from $ 100.0 to $ 1000.0

Apple iPod nano 3rd Generation Black @ 8GB) USED          0 Bids    $115.0     27d 14h 25m 33s
   View item in a new window 2. Search keywords "wii" in "All Categories" and priced from $ 100.0 to $ 1000.0

LOT OF 14 WII GAMES                                        0 Bids    $300.0     28d 12h 58m 56s 351 groups: 353, 355, 357
359 groups: 361, 363

FIG. 3B

SEARCHING MULTIPLE SELLERS BY MULTIPLE MATCHING ITEMS

This application is a U.S. National Stage Filing under 35 U.S.C. 371 from International patent application Ser. No. PCT/CN2009/001481, filed Dec. 17, 2009, and published on Jun. 23, 2011 as WO 2011/072424 A1, the contents of which are incorporated herein by reference in their entirety.

TECHNICAL FIELD

The present application relates generally to the field of computer technology and, in a specific exemplary embodiment, to a system and method of searching a multitude of sources simultaneously for two or more items.

BACKGROUND

During the past several years, a substantial growth has occurred in the quantity and diversity of information and services available over the Internet. The number of users of the Internet has similarly grown rapidly. A predominant growth area on the Internet has been in the use of the World Wide Web, often referred to as WWW, W3, or simply "the Web." The hyper-text transfer protocol (HTTP) that serves as a foundation protocol for the Web has been widely adopted and implemented in numerous Web browsers and Web servers.

Web browsers provide a convenient user application for receiving textual and graphical information of individual Web pages in a scrollable display page format. The Web pages frequently allow a typical end-user to access a variety of educational, commercial, and retail Web sites through search boxes.

BRIEF DESCRIPTION OF DRAWINGS

Various ones of the appended drawings merely illustrate exemplary embodiments of the present invention and cannot be considered as limiting its scope.

FIG. 3B is an exemplary results interface produced from the user prompt interface of FIG. 3A;

DETAILED DESCRIPTION

Figure 1:
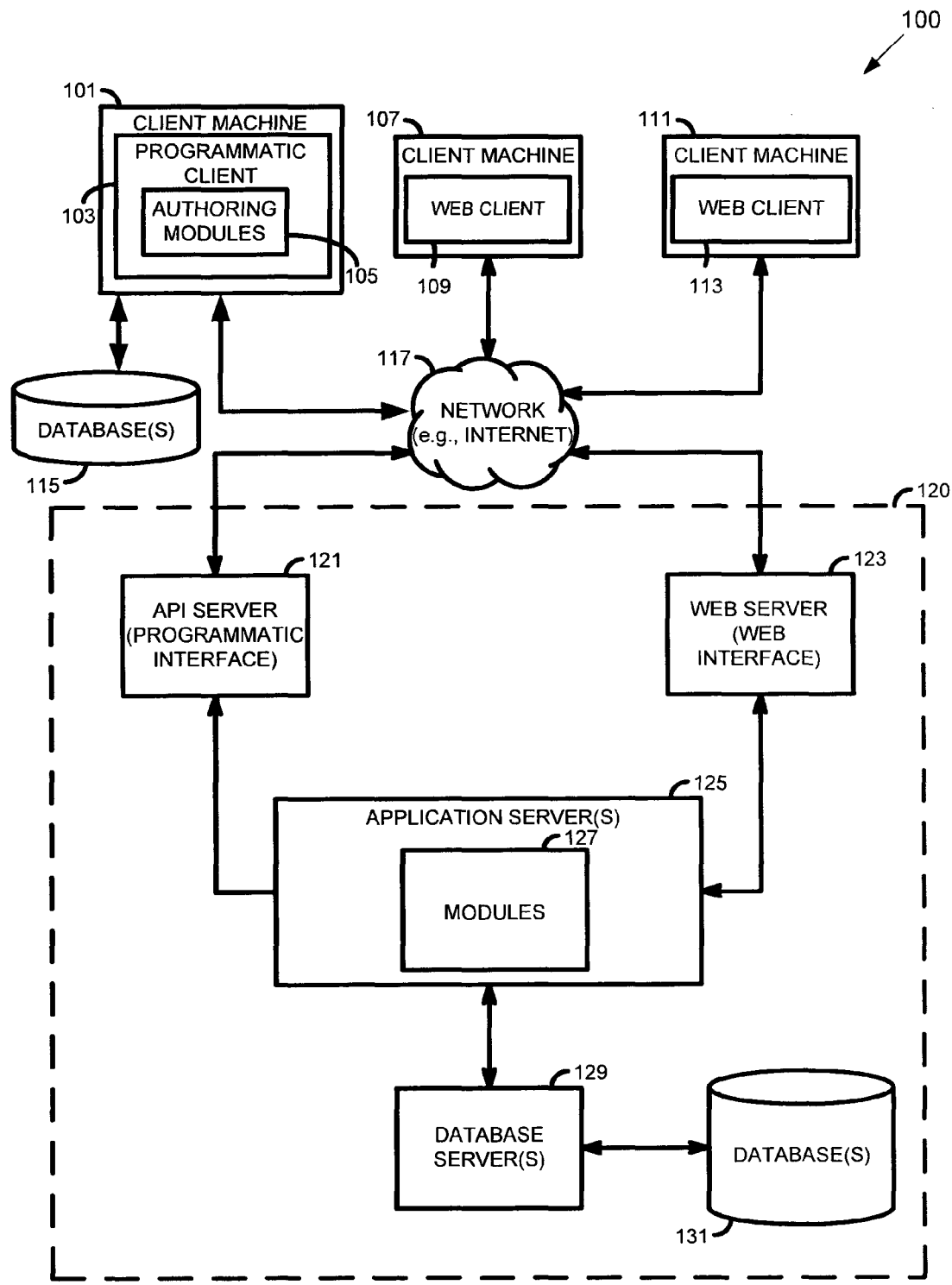
FIG. 1 is a block diagram of an exemplary embodiment of a high-level client-server-based network architecture diagram depicting a system used to process end-user queries.

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on end-user queries in an electronic retail or marketplace environment, the embodiments are given merely for clarity in disclosure. Thus, any type of electronic commerce or electronic business system and method, including various system architectures, may employ various embodiments of the end-user search system and method described herein and are considered as being within a scope of the present invention.

In an exemplary embodiment, a system to perform a search concurrently for several items in an electronic marketplace environment is disclosed. The system includes a keyword prompt engine to receive keywords from an end-user describing the items. The keywords are related to each of the several items for which the end-user is searching. A price range prompt engine receives a price range from the end-user for each of the several items. A search engine uses one or more processors to locate, from an inventory within the electronic marketplace environment, the several items that match the keywords and the price range. The search engine further matches concurrently each of the sellers having the several items available for sale.

In another exemplary embodiment, a method (and related machine-readable storage medium, e.g., a DVD or CD-ROM, for storing the method) to perform a search for several items in an electronic marketplace environment are disclosed. The method includes prompting an end-user for criteria related to the several items. The criteria are selected to include keywords from the end-user that are related to the several items for which the end-user is searching. The criteria further include a price range for each of the several items. The criteria are used to perform a search to locate the several items in an inventory within the electronic environment that match the criteria. The search engine also matches concurrently sellers having the several items available for sale.

In another exemplary embodiment, a method (and related machine-readable storage medium, e.g., a DVD or CD-ROM, for storing the method) to provide search results in an electronic marketplace environment in response to a received search query is disclosed. The method includes prompting an end-user for criteria related to several items the end-user desires to purchase. The criteria are selected to include keywords from the end-user. The keywords are related to each of the several items for which the end-user is searching. The criteria further include a price range for each of the several items and a category identifier for each of the items. The criteria are used to perform a search, the search using one or more processors, to locate the plurality of items in an inventory within the electronic marketplace environment that match the criteria. The search also matches concurrently the sellers, many or all of which may have been previously unknown to the end-user, that have at least a portion of the items available for sale. A listing of the sellers and the related items is presented to the end-user. Each of these exemplary embodiments, and others, is discussed in detail, below.

With reference to FIG. 1, a high-level network diagram of an embodiment of an exemplary system 100 with a client-server architecture includes a first client machine 101, a second client machine 107, a third client machine 111, a network 117 (e.g., the Internet), and an information storage and retrieval platform 120. The information storage and retrieval platform 120 may constitute a commerce platform or commerce server and provides server-side functionality, via the network 117, to the first 101, second 107, and third 111 client machines. A programmatic client 103 in the form of authoring modules 105 is executing on the first client machine 101, a first web client 109 (e.g., a browser, such as the Internet Explorer browser developed by Microsoft Corporation of Redmond, Wash.) is executing on the second client machine 107, and a second web client 113 is executing on the third client machine 111. Additionally, the first client machine 101 is coupled to one or more databases 115.

Turning to the information storage and retrieval platform 120, an application program interface (API) server 121 and a web server 123 are coupled to, and provide programmatic and web interfaces respectively to, one or more application servers 125. The application servers 125 host one or more modules 127 (e.g., modules, applications, engines, etc.). The application servers 125 are, in turn, coupled to one or more database servers 129 that facilitate access to one or more information storage databases 131. The one or more modules 127 provide a number of information storage and retrieval functions and services to users that access the information storage and retrieval platform 120. The one or more modules 127 are discussed in more detail, below.

While the exemplary system 100 of FIG. 1 employs a client-server architecture, a skilled artisan will recognize that the present disclosure is not limited to such an architecture. The exemplary system 100 could equally well find application in a distributed or peer-to-peer architecture system. The one or more modules 127 and the authoring modules 105 may also be implemented as standalone software programs, which do not necessarily have networking capabilities.

The first 109 and second 113 web clients access the one or more modules 127 via the web interface supported by the web server 123. Similarly, the programmatic client 103 accesses the various services and functions provided by the one or more modules 127 via the programmatic interface provided by the API server 121. The programmatic client 103 may be, for example, a seller application (e.g., the "Turbo Lister 2" application developed by eBay Inc., of San Jose, Calif.) enabling sellers to author and manage data items or listings on the information storage and retrieval platform 120 in an off-line manner. Further, batch-mode communications can be performed between the programmatic client 103 and the information storage and retrieval platform 120. In addition, the programmatic client 103 may include, as previously indicated, the authoring modules 105 used to author, generate, analyze, and publish domain rules and aspect rules used in the information storage and retrieval platform 120 to structure data items and transform queries. Such domain and aspect rules are known independently in the art.

Figure 2:
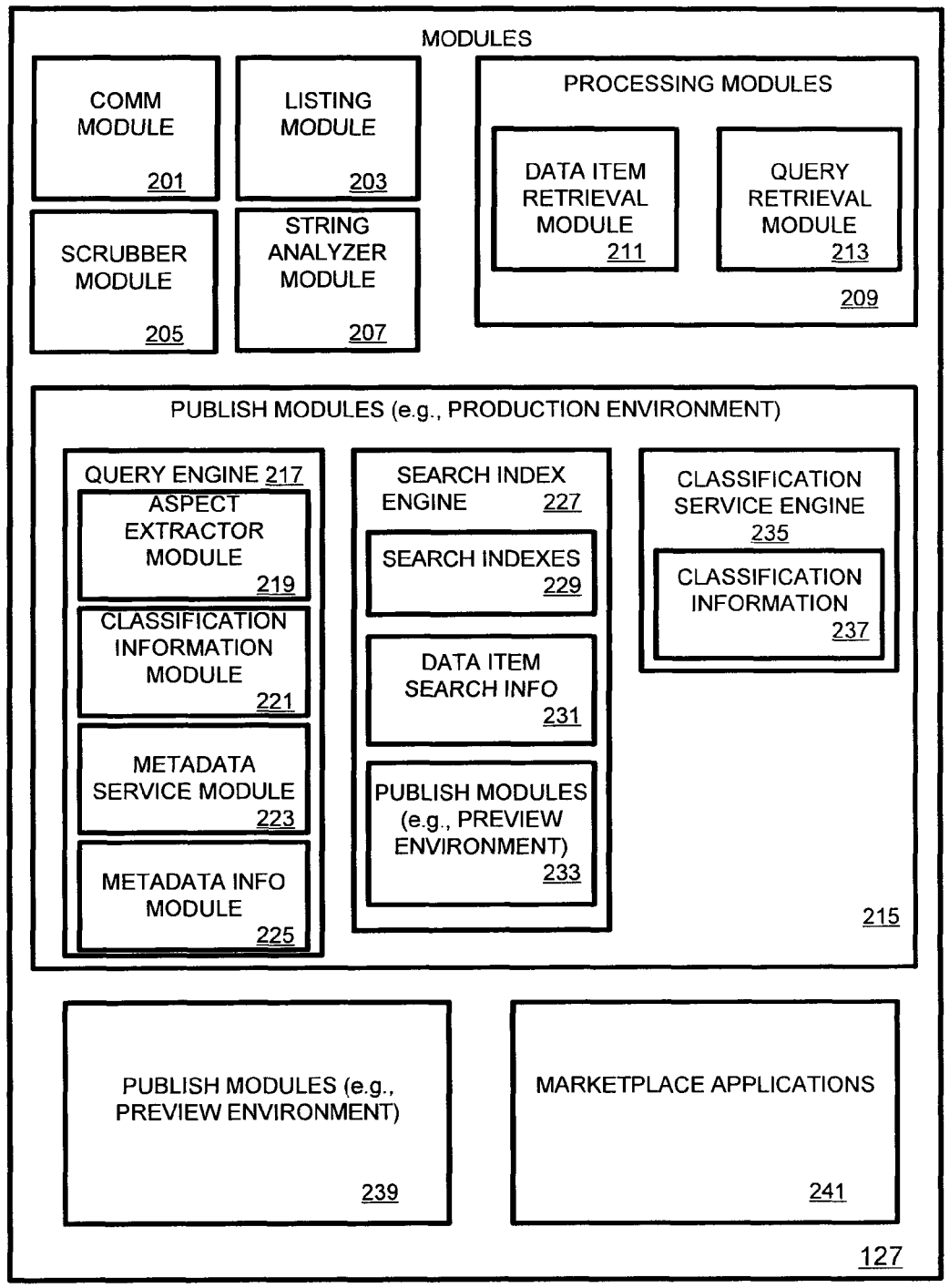
FIG. 2 is a block diagram illustrating an exemplary embodiment of various modules of the network architecture of FIG. 1.

Referring now to FIG. 2, an exemplary block diagram of the one or more modules 127 includes a communication module 201, a listing module 203, a scrubber module 205, a string analyzer module 207, a plurality of processing modules 209, and a first 215 and second 239 publishing module. The first publishing module 215 is used in a production environment while the second publishing module 239 is used in a preview environment. The one or more modules 127 further includes a marketplace application block 241. Each of the first 215 and second 239 publishing modules includes a query engine 217, a search index engine 227, and a classification service engine 235 (the individual engines are only shown in the first publishing module 215 but are readily envisioned by a skilled artisan in the second publishing module 239 as well). The first 215 and second 239 publishing modules are each utilized to publish new or existing rules to either the production environment or the preview environment, as appropriate, in the information storage and retrieval platform 120 of FIG. 1 thereby enabling the rules to be operative (e.g., applied to data items and queries) in the respective environments.

In a specific exemplary embodiment, the information storage and retrieval platform 120 of FIG. 1 may be embodied as a network-based marketplace that supports the transaction of data items or listings (e.g., goods or services) between sellers and buyers. One such marketplace is eBay, the World's Online Marketplace, developed by eBay Inc., of San Jose, Calif. In this specific exemplary embodiment, the information storage and retrieval platform 120 may receive information from sellers describing the data items that may subsequently be retrieved by potential buyers or bidders. The one or more modules 127 may therefore include the marketplace application block 241 to provide a number of marketplace functions and services to end-users that access the information storage and retrieval platform 120.

The preview environment enables a category manager (not shown) to analyze rules and determine whether such rules perform as expected without affecting live operations in the production environment. For example, the preview environment enables a most popular query analysis, a domain coverage analysis, an aspect coverage analysis, and an aspect-value pair coverage analysis as described later in this document. After determining that rules perform as expected, the category manager publishes the rules to the production environment in the information storage and retrieval platform 120.

The communication module 201 receives a query from one or more of the client machines 101, 107, 111 (FIG. 1). The query may include one or more constraints (e.g., keywords, categories, or information specific to a type of data item). The communication module 201 interacts with the query engine 217 and the search index engine 227 to process the query. The communication module 201 receives aspect-value pairs extracted from the query. Further, the communication module 201 constructs a transformed query based on the aspect-value pairs extracted from the query and communicates an interface (e.g., a graphical user interface) to an end-user at one or more of the client machines 101, 107, 111.

A query retrieval module 213 receives information from one or more of the client machines 101, 107, 111 and stores the information as a data item in the one or more information storage databases 131 (FIG. 1). For example, an end-user acting as a seller, may operate one of the one or more of the client machines 101, 107, 111 to enter descriptive information for a data item for the purpose of offering the data item for sale or auction through the information storage and retrieval platform 120.

The plurality of processing modules 209 receives classification information and metadata information. The plurality of processing modules 209 publishes the classification and metadata information to a production environment or a preview environment. The plurality of processing modules 209 may also publish to the production environment by publishing the classification and metadata information to backend servers (not shown) that host the query engine 217, the search index engine 227, and the classification service engine 235. The plurality of processing modules 209 publishes to a preview environment by publishing the classification and metadata information to a local backend server (not shown) hosting the query engine 217, the search index engine 227, and the classification service engine 235.

The plurality of processing modules 209 further includes a data item retrieval module 211 to receive requests for data items from a category manager operating the first client machine 101. For example, responsive to receiving a request, the data item retrieval module 211 reads data items from the data item information stored on the one or more information storage databases 131 (FIG. 1) and stores the data items as sample information in the one or more databases 115.

The query retrieval module 213 receives requests for queries from a category manager operating the first client machine 101. For example, responsive to receiving the request, the query retrieval module 213 reads queries from the sample information and communicates the queries to the first client machine 101.

The scrubber module 205 receives item information entered by one or more of the client machines 101, 107, 111 creating a data item. The scrubber module 205 utilizes services of the classification service engine 235 to structure the item information in the data item (e.g., applies domain and aspect rules).

The string analyzer module 207 receives requests from the first client machine 101 to identify candidate values to associate with an aspect. The request may include the aspect and one or more values that have been associated to the aspect. The string analyzer module 207 utilizes the aspect (e.g., "color") to identify strings of text in a database that includes the aspect. The string analyzer module 207 relies on various services provided in the information storage and retrieval platform 120 to identify and process the strings of text. For example, the string analyzer module 207 utilizes services that expand the aspect to a derivative form of the aspect including a singular form (e.g., "color"), a plural form (e.g., "colors"), a synonymous form, an alternate word form (e.g., "chroma," "coloring," "tint"), a commonly misspelled form (e.g., "collor") or an acronym form.

In a specific exemplary embodiment, the string analyzer module 207 identifies boundaries of a string of text based on a position of the aspect and derivatives thereof in the string of text. For example, the string analyzer module 207 identifies boundaries of the string of text based on a predetermined number of words to the left and right of the aspect in the string of text. The predetermined number of words may be a configurable value. After the strings of text have been identified, the string analyzer module 207 relies on a service in the information storage and retrieval platform 120 to remove any stop words from the strings (e.g., "the," "and," or "if"). For example, stop words may include prepositions and antecedents since they are not candidate values. Next, the string analyzer module 207 removes the aspect values received in the request from the string. Finally, the string analyzer module 207 returns the remaining candidate values to the first client machine 101.

A database (not shown specifically) utilized by the string analyzer module 207 includes queries that have been entered by a user to the information storage and retrieval platform 120 or data items that have been entered by a user to the information storage and retrieval platform 120, dictionaries, or thesauruses. The string analyzer module 207 analyzes the strings of text to identify candidate values to associate with the aspect. More examples of query strings and searching techniques are given, below.

The classification service engine 235 applies domain rules and aspect rules to data items. For example, the classification service engine 235 applies domain rules to identify one or more domain-value pairs (e.g., product type=electronic MP3 players) associated with the data item. The classification service engine 235 further applies the aspect rules to identify aspect-value pairs (e.g., brand=Apple) associated with the data item. The classification service engine 235 applies the domain and aspect rules to data items or listings as they are added to the information storage and retrieval platform 120 or responsive to the publication of new rules (e.g., domain rules or aspect rules).

The classification service engine 235 processes data items received from the second 107 and third 111 client machines. For example, the scrubber module 205 uses services of the classification service engine 235, as described previously, to apply domain rules and aspect rules to the data item. The classification service engine 235 further stores the data item, with the associated domain-value pairs and aspect-value pairs, in the one or more information storage databases 131 (FIG. 1) as item search information. Further, the classification service engine 235 pushes or publishes item search information over a bus (not shown but implicitly understood by a skilled artisan) in real time to the search index engine 227. The classification service engine 235 executes in the preview environment enabling analysis of newly authored rules before publication of the rules to the production environment. The classification service engine 235 further maintains histogram information in the form of data item counters as the domain and aspect rules are applied to the data items. For example, the classification service engine 235 may increment a data item counter responsive to a condition clause in a domain or aspect rule evaluating TRUE. The histogram information communicates to one or more of the client machines 101, 107, 111 that utilize the histogram information to determine percentage coverage for most popular queries, domains, aspects, and aspect-value pairs.

The query engine 217 includes an aspect extractor module 219, a classification information module 221, a metadata service module 223, and a metadata information module 225. In the production environment, the aspect extractor module 219 receives a query from the communication module 201 and applies aspect rules to extract aspect-value pairs from the query. Further, the aspect extractor module 219 communicates the query received from the communication module 201 to the plurality of processing modules 209 that stores the query as sample query information.

In the preview environment, the aspect extractor module 219 receives the most popular queries from one or more of the client machines 101, 107, 111 and applies aspect rules to extract aspect-value pairs from the query. Further, the aspect extractor module 219 maintains histogram information in the preview environment while applying the aspect rules to the queries. For example, the query engine 217 responds to a condition clause that evaluates TRUE (e.g., matching keyword) by incrementing a data item counter associated with the respective query. Further, in the production environment, the aspect extractor module 219 communicates the aspect-value pairs to the communication module 201.

The metadata service module 223 communicates metadata information to the communication module 201 based on a query received from the communication module 201. The metadata information includes metadata that the communication module 201 uses to format and generate an interface (e.g., a user interface).

The search index engine 227 includes search indexes and data item search information (e.g., including data items and associated domain-value pairs and aspect-value pairs). In the production environment, the search index engine 227 receives the transformed query from the communication module 201 and utilizes the search indexes to identify data items based on the transformed query. Further, in the production environment, the search index engine 227 communicates the found data items to the communication module 201.

Application of Searching Multiple Sellers in the Exemplary Network Architecture

Currently, an end-user of an electronic marketplace system may wish to purchase two different types of items. For example, one item may be an "iPod Nano®," and the other item is a "Wii®." However, in order to save shipping fees, the end-user prefers to purchase both items from the same seller or merchant. However, there is no way for the end-user to know in advance who the sellers or merchants carrying the combination of items might be. The sellers or merchants are typically unknown to the end-user prior to performing a search.

Currently, there is no electronic support for searches combining both results of various item types with results from the same seller. Therefore, in order to find such a seller, the end-user needs to perform the "iPod Nano®" search first, and then perform the "Wii®" search and manually locate a common seller. Alternatively, the "iPod Nano®" search is performed and when the end-user determines a virtual store or shop of the matching seller, performs a subsequent search for a Wii®. The end-user needs to repeat this process seller-by-seller until a common seller for both item types is found. Additionally, if such a common seller is located, the end-user may desire to find more such sellers to compare item prices, the feedback ranking for each seller, and other related characteristics. Even with a search for only two items, the search and manual sorting process is tedious and time consuming. A search to find all sellers who are selling three or more different types of items is nearly impossible to perform manually.

Figure 3A:
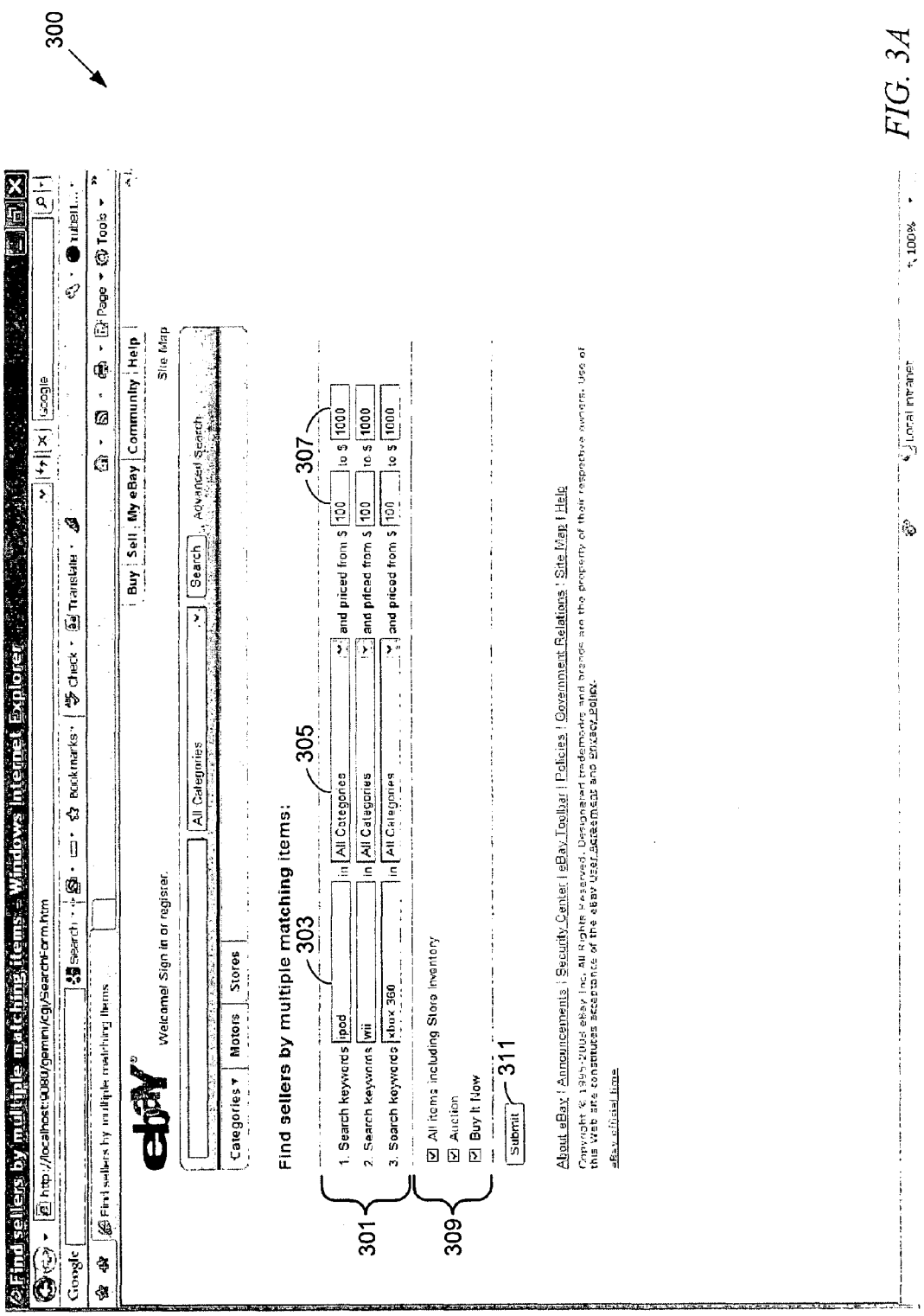
FIG. 3A is an exemplary user prompt interface used in query and search engines to access the modules of FIG. 2.

With reference to FIG. 3A, an exemplary user-prompt interface 300 is shown whereby a user may find sellers selling multiple matching items. The user-prompt interface 300 is shown to include a number of search boxes to assist in an end-user search. For example, a series of search boxes 301 is shown to include a keyword field 303, a category field 305, and a price range field 307. Each of the series of search boxes 301 is presented by means of a search module or search engine described herein. Although the series of search boxes 301 indicates only three sets of fields, a skilled artisan will recognize that any number of fields can be included. For example, once the end-user has entered information into the third of the three sets of fields, a new set of fields may appear automatically. Alternatively, an end-user may select a button (not shown) to enter an additional set of fields. Such techniques such as automatically adding additional fields to the exemplary user-prompt interface 300 are known independently in the art.

The keyword field 303 boxes may consist of, for example, drop-down matching boxes, auto-complete boxes, arbitrary-length boxes (that may include Boolean search string entries such as "red" AND "second generation" ANDNOT "new"), or any combination thereof. The category field 305 boxes can be drop-down matching boxes but may also be similar in structure to the keyword field 303 boxes just described. In either case, a category identifier such as "electronics" or "video games" may be entered into the category field 305. The price range field 307 boxes are generally direct user input fields but may also include features such as a drop-down box to assist the end-user in inputting a range of prices. Additionally, the price range field 307 boxes can also be keyed to a given currency (e.g., US dollars, Japanese yen, or Norwegian kroner) depending upon a geographical region in which the end-user is located.

Either before or after the end-user has entered preferences in the series of search boxes 301, a series of selection criteria boxes 309 may also be selected. The series of selection criteria boxes 309 may include any combination of, for example, a selection of all items including store inventory, auction items, and "But It Now" items. Once the end-user has entered preferences in the series of search boxes 301 and the series of selection criteria boxes 309, the end-user selects a submit button 311 to perform a search using the criteria and ranges entered into the exemplary user-prompt interface 300. Prior to selecting the submit button 311, the end-user may also choose to store (not shown) criteria entered into the exemplary user-prompt interface 300.

Referring now to FIG. 3B, an exemplary seller search results page 350 is shown to include results from the search including two sellers matching at least a portion of all entered criteria. For example, a first seller results display 351 and a second seller results display 359 indicate results of searches related to the end-user input criteria. The exemplary seller search results page 350 can be displayed to the end-user by various means known independently in the art and discussed herein, below. The first seller results display 351 indicates a first search-box result frame 353 based on search input queries of "iPod®" in "All Categories" priced between "$100" and "$1000" on the first of the series of search boxes 301 (see FIG. 3A). A second search-box result frame 355 and a third search-box result frame 357 indicates similar types of results for "Wii®" and "XBOX 360®" from the second and third of the series of search boxes 301.

In the second seller results display 359, only the first two of the series of search boxes 301 have been matched with a first search-box result frame 361 based on search input queries of "iPod®" in "All Categories" priced between "$100" and "$1000" on the first of the series of search boxes 301 and a second search-box result frame 363 for the "Wii®" entered at the second of the series of search boxes 301. In this case, the second seller results display 359 shows no match for the "XBOX 360®" from the third of the series of search boxes 301. Had additional matches been produced, the exemplary seller search results page 350 would indicate that, for example, additional pages include further results or the exemplary seller search results page 350 may simply be scrolled to indicate all matching results.

If all entered criteria has not been found, the exemplary seller search results page 350 may display one or more sellers where a "closest match" is found and indicate (not shown) to the end-user the fields that could not be matched in the search. For example, if the end-user entered a range of prices in the price range field 307 (see FIG. 3A), then the exemplary seller search results page 350 may prompt the end-user to either select a higher price range or a less restrictive price range. Optionally, the end-user can simply leave the price range field 307 blank in either an initial search or any subsequent searches. As long as the exemplary user-prompt interface 300 has enough input to perform a search (including, for example, at least an item description in the keyword field 303), a search may be performed.

Figure 4:
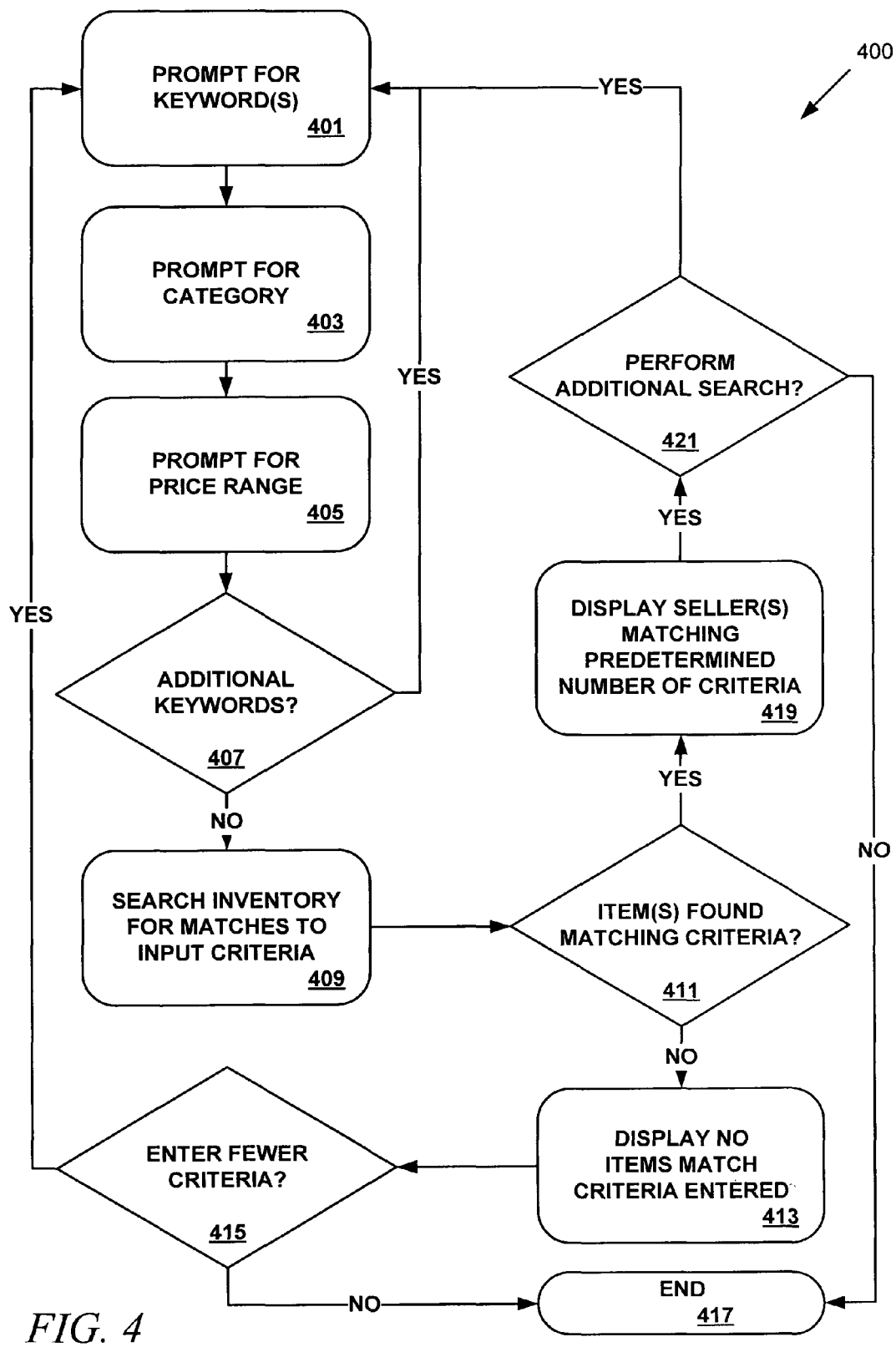
FIG. 4 is a flowchart of an exemplary method for selecting and evaluating criteria to determine common resources matching criteria of FIG. 3A.

In FIG. 4, an exemplary method 400 for selecting and evaluating criteria to determine common resources matching end-user criteria is illustrated. At operation 401, an end-user is prompted for one or more keywords. The end-user is then prompted to enter a category, at operation 403, and a price range, at operation 405. These steps may be similar to those described above with reference to the series of search boxes 301 (see FIG. 3A). At operation 407, a determination is made whether one or more additional keywords are to be entered by the end-user for an additional item or items. If one or more additional keywords are to be entered, then the exemplary method 400 once again prompts for one or more keywords at operation 401 and the process continues. If one or more additional keywords are not to be entered, then the exemplary method 400 continues at operation 409.

The operation 409 performs a search of an existing inventory of items as located in, for example, the modules 127 or the information storage databases 131 within the exemplary system 100 (see FIG. 1). A determination is made at operation 411 whether one or more items matching the criteria input by the end-user are found. If one or more items are not found, then a display is presented to the end-user at operation 413 that no items matching the entered criteria were found and the end-user is presented with an option to enter fewer criteria at operation 415. If the end-user chooses not to enter fewer criteria, then the exemplary method 400 ends at operation 417. Alternatively, if the end-user chooses to run one or more additional searches using fewer criteria, the exemplary method 400 once again prompts for one or more keywords at operation 401 and the process begins anew.

If, at operation 411, one or more items are found, then the end-user is presented with a display (e.g., such as a display of the exemplary seller search results page of FIG. 3B) at operation 419. The display presents one or more sellers having items meeting at least a predetermined number of the end-user entered criteria from operations 401, 403, and 405. Alternatively, the display may present a list in decreasing order based on the number of items matched to each seller. The end-user is then offered an opportunity to perform an additional search at operation 421. If the end-user chooses to perform another search, with criteria either related or unrelated to the prior search, the exemplary method 400 once again prompts for one or more keywords at operation 401 and the search process, again, begins anew. However, if the end-user chooses not to perform another search, the exemplary method 400 ends at operation 417.

The various embodiments described above present a useful solution to a current technical problem: using, for example, one or more processors to perform a search over a potentially huge inventory of items, involving a large numbers of sellers of the items, and present the results of the search to the end-user. The search has eliminated the problem of the end-user performing an arduous, if not impossible task, of first performing a manual task of searching through the huge inventory of items and then attempting to match related sellers of the items. Consequently, the end-user can now find sellers by multiple matching multiple items at one time such that the end-user can buy all the items from the same seller, in order to, for example, save shipping fees, receive discounts for consolidated purchases, save communication efforts, decrease the possibility of a bad buying experience (since, in common seller cases, only large sellers can typically match the criteria of the end-user), and make certain all the items purchased arrive at the same time, and not one-by-one.

While various embodiments of the present invention are described with reference to assorted implementations and exploitations, it will be understood that these embodiments are illustrative only and that a scope of the present inventions are not limited to them. In general, techniques for the searches or methods described herein may be implemented with facilities consistent with any hardware system or hardware systems defined herein. Many variations, modifications, additions, and improvements are possible.

Plural instances may be provided for resources, operations, or structures described herein as a single instance. Finally, boundaries between various resources, operations, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of the present invention that is represented by the appended claims.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. Other embodiments contemplate one or more of the various engines or modules being implemented in hardware including, for example, computer processors, field programmable gate arrays (FPGAs), application specific integrated circuits (ASICs), or other types or hardware known to a skilled artisan.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Storage Medium

Figure 5:
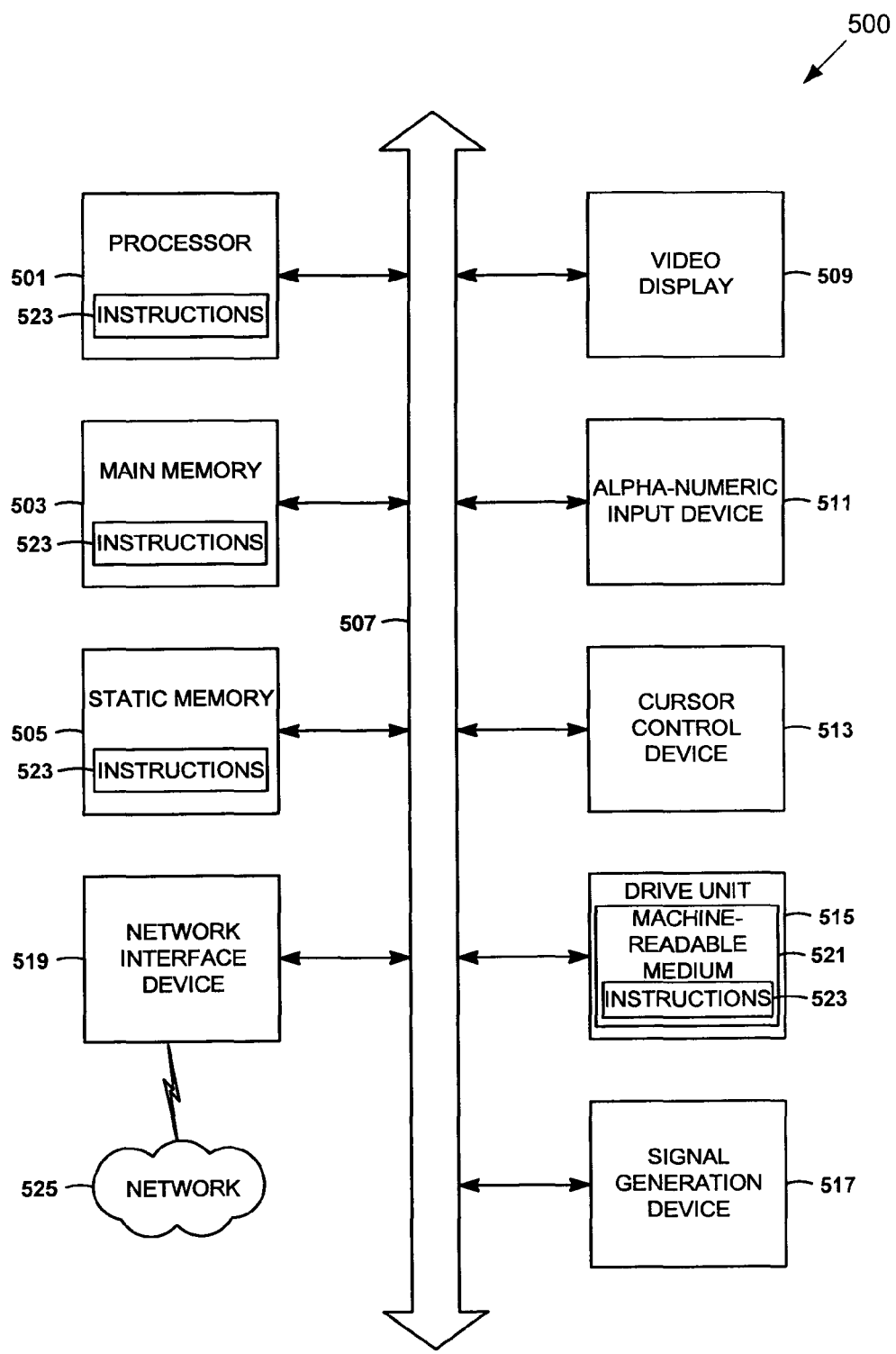
FIG. 5 is a simplified block diagram of a machine in an exemplary form of a computing system within which a set of instructions, for causing the machine to perform any one or more of the methodologies discussed herein, may be executed.

With reference now to FIG. 5, an exemplary embodiment extends to a machine in the form of a computer system 500 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), and a network interface device 520.

Machine-Readable Medium

The disk drive unit 516 includes a machine-readable medium 522, for example, a machine-readable storage medium, on which is stored one or more sets of instructions and data structures (e.g., software 524) embodying or used by any one or more of the methodologies or functions described herein. The software 524 may also reside, completely or at least partially, within the main memory 504 or within the processor 502 during execution thereof by the computer system 500; the main memory 504 and the processor 502 also constituting machine-readable media.

While the machine-readable medium 522 is shown in an exemplary embodiment to be a single medium, the term "machine-readable medium" may include a single medium or multiple media (e.g., a centralized or distributed database, or associated caches and servers) that store the one or more instructions. The term "machine-readable medium" or, similarly, "machine-readable storage medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 524 may further be transmitted or received over a communications network 525 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an embodiment has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown.

This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, algorithms, programming tools, and topologies of systems. A skilled artisan will recognize, however, that additional embodiments may be focused on electronic business applications and accompanying system architectures in general and not specifically to electronic searching of consumer sites.

These and various other embodiments are all within a scope of the present invention. The specification and drawings are, accordingly, to be regarded in an illustrative rather than a restrictive sense.

What is claimed is:

1. A system comprising:
  one or more hardware processors;
  a network interface device configured to transmit using an electronic communications network;
  a search engine to generate a user-prompt interface that includes two or more sets of keyword fields, each set of keyword fields configured to receive keywords related to a plurality of items and a price range for the items, the items available for purchase in an electronic marketplace, the keyword prompt engine further transmits the user-prompt interface to a client machine over the communications network using the network interface device;
  a keyword prompt engine to receive, via the network interface device and from the client machine, the keywords for each set of keyword fields in the user-prompt interface;
  a price range prompt engine to receive the price range from the user-prompt interface for each set of keyword fields, wherein the search engine, using the one or more hardware processors and over the communications network, queries one or more electronic information storage databases to locate, from an inventory within the electronic marketplace, one or more sellers having items for sale that match more than one of the sets of keywords with their respective price ranges; and
  a display engine to transmit to the client machine using the network interface device a listing of the one or more sellers with their respective items that match.

2. The system of claim 1, wherein the user-prompt interface further includes a category identifier field in each of the sets of keywords fields, the system further comprising a category prompt module to receive a category identifier for each of the sets of keywords.

3. A method comprising:
  generating, using one or more hardware processors, a user-prompt interface that includes two or more sets of keyword fields, each set of keyword fields configured to receive keywords related to a plurality of items and a price range for the items, the items available for purchase in an electronic marketplace;
  transmitting the user-prompt interface to a client machine over a communications network using a network interface device;
  receiving, via the network interface device and from the client machine, the keywords for each set of keyword fields in the user-prompt;
  receiving the price range from the user-prompt interface for each set of keyword fields;
  querying one or more electronic information storage databases to locate, from an inventory within the electronic marketplace, one or more sellers having items for sale that match more than one of the sets of keywords with their respective price ranges; and
  transmitting, to the client machine using the network interface device, a listing of the one or more sellers with their respective items that match.

4. The method of claim 3 wherein each set of keyword fields further includes a category field, wherein the items that match also match the category field.

5. A tangible machine-readable storage device storing instructions that, when executed by a processor, causes the processor to perform operations comprising:
  generating, using one or more hardware processors, a user-prompt interface that includes two or more sets of keyword fields, each set of keyword fields configured to receive keywords related to a plurality of items and a price range for the items, the items available for purchase in an electronic marketplace;
  transmitting the user-prompt interface to a client machine over a communications network using a network interface device;
  receiving, via the network interface device and from the client machine, the keywords for each set of keyword fields in the user-prompt;
  receiving the price range from the user-prompt interface for each set of keyword fields;
  querying one or more electronic information storage databases to locate, from an inventory within the electronic marketplace, one or more sellers having items for sale that match more than one of the sets of keywords with their respective price ranges; and
  transmitting, to the client machine using the network interface device, a listing of the one or more sellers with their respective items that match.

6. The tangible machine-readable storage device of claim 5, wherein the operations further comprise prompting a user of the client machine for a category identifier and including the category identifier in the querying.

* * * * *